Feb. 23, 1960    M. P. CHAPLIN    2,925,863
PULP MOLDING MACHINE
Filed Oct. 12, 1953    6 Sheets-Sheet 1

Merle P Chaplin
INVENTOR

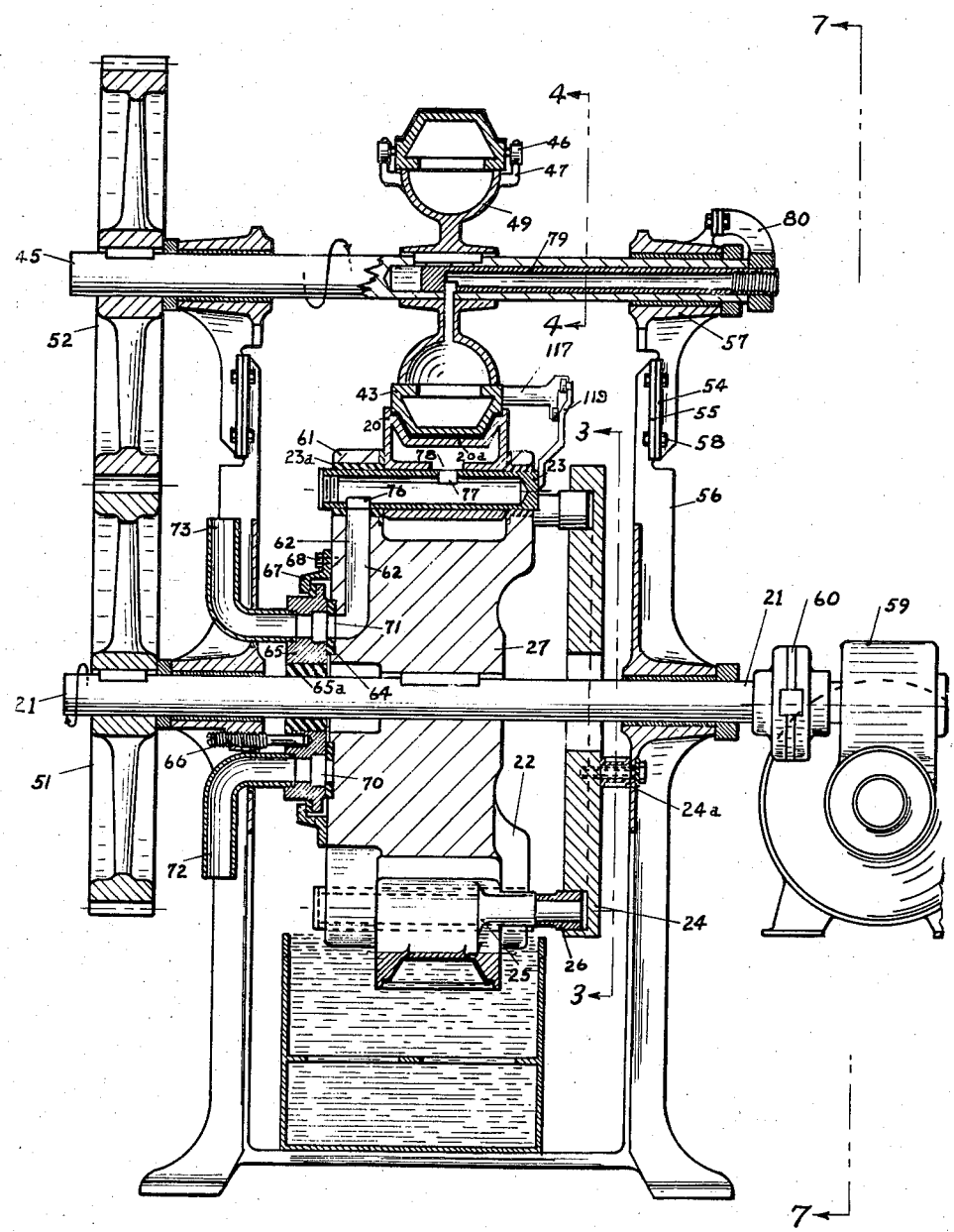
Fig. 2.  Merle P. Chaplin
INVENTOR

Feb. 23, 1960
M. P. CHAPLIN
2,925,863
PULP MOLDING MACHINE
Filed Oct. 12, 1953
6 Sheets-Sheet 5
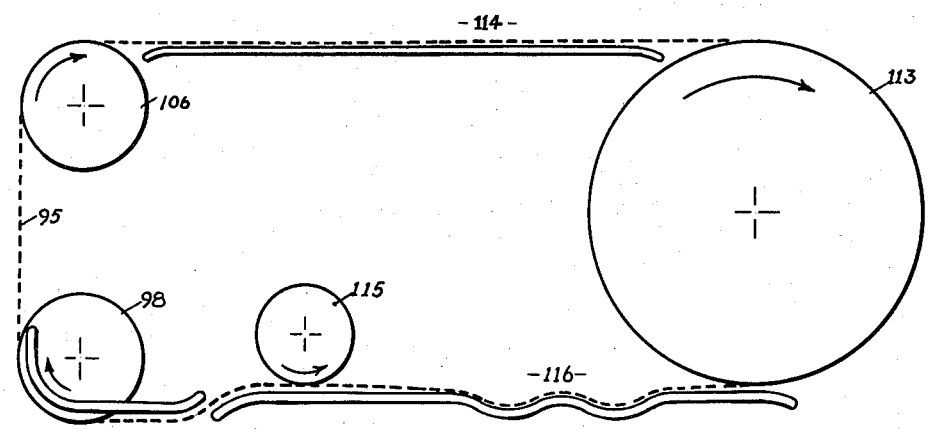
Fig.-6-
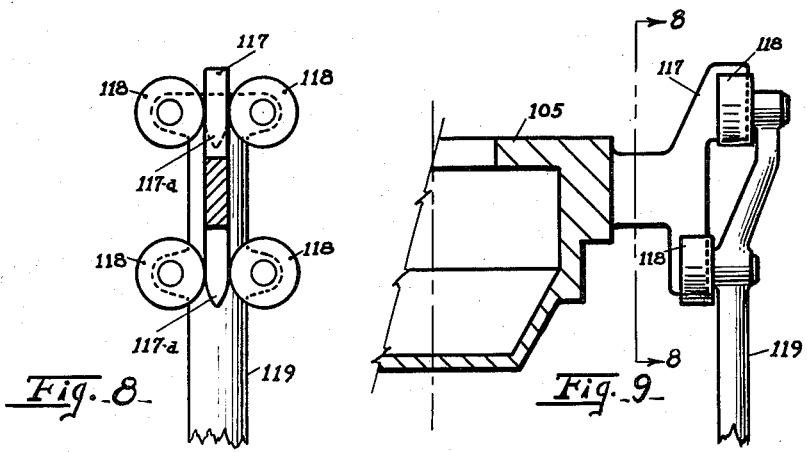
Fig.-8-   Fig.-9-
Merle P. Chaplin
INVENTOR

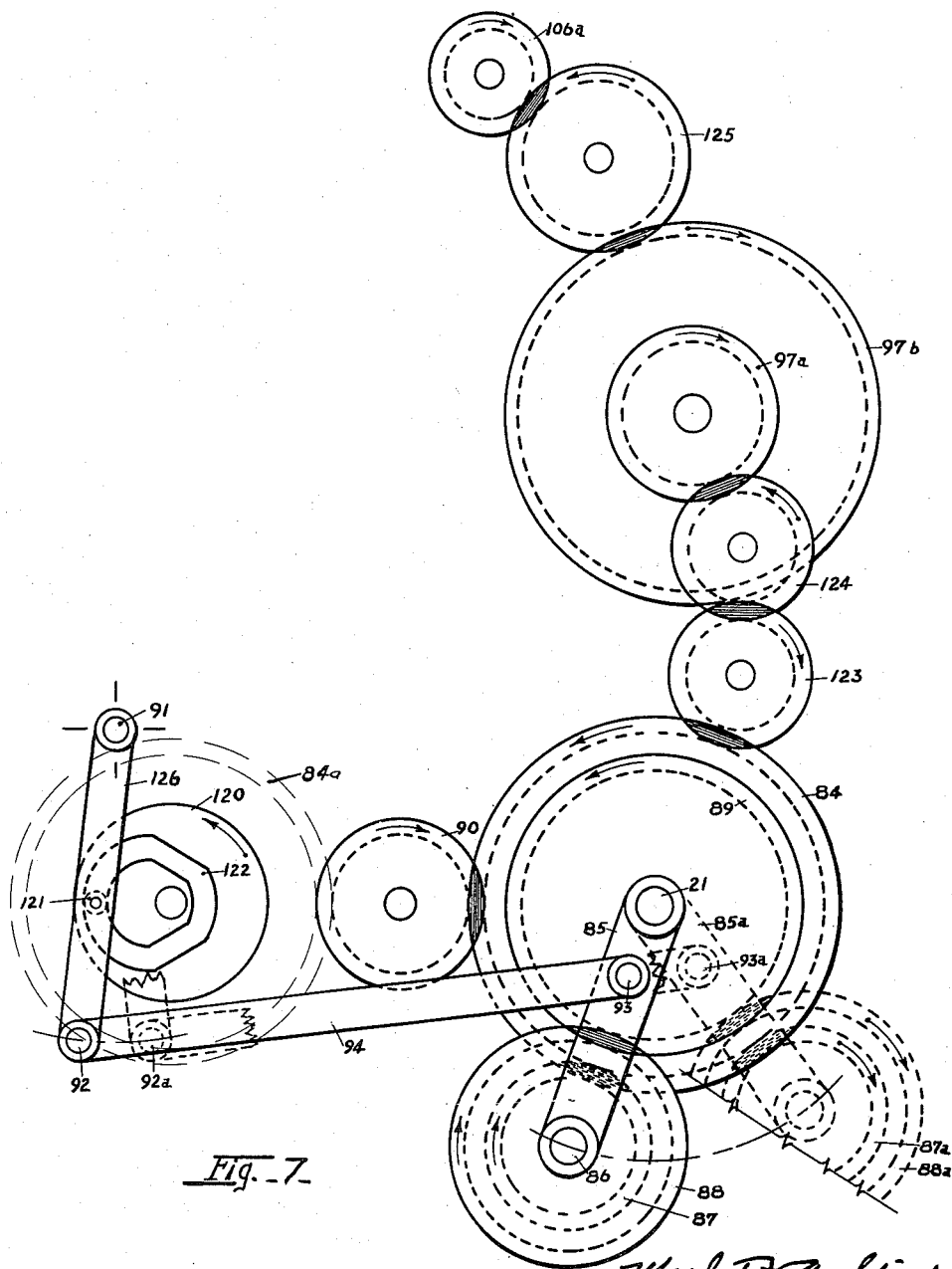

United States Patent Office 2,925,863
Patented Feb. 23, 1960

2,925,863

PULP MOLDING MACHINE

Merle P. Chaplin, South Portland, Maine, assignor, by mesne assignments, to Diamond National Corporation, a corporation of Delaware Application October 12, 1953, Serial No. 385,343

2 Claims. (Cl. 162—391)

This invention relates to pulp molding machines and particularly to improved pulp molding machines of the rotary type especially adapted for molding relatively large articles of uniform quality at a high production rate.

In my Patent Number 2,163,585, I disclose certain mechanisms employed in the manufacture of molded pulp articles whereby coperating dies are brought into alignment and parallelism through a toggle motion, all dies moving completely about parallel shafts in a circular path. In this patent the dies on which the articles are formed are relatively small and move through a narrow arc of pulp stock materials in a forming tank. The arc of contact, or the amount of immersion of the dies on which the articles are formed must necessarily be shallow, with a short immersion interval, if an unevenness in article thickness and fiber deposit is to be avoided. When the die is immersed or is entering the pulp mixture, a very low vacuum or suction is applied behind the die's face to cause a fiber deposit. However, as the die is leaving the pulp mixture, a strong vacuum is necessary to hold and secure the deposit to the die surface, and as a portion of the die leaves the pulp mixture before other portions, an uneven deposit inevitably results. This is particularly true if large dies are employed, or if a greater portion of the forming wheel and dies are immersed in the pulp mixture. Hence, if relatively large articles are desired, considerable difficulty is encountered in the use of the mechanism of my prior patent wherein the dies on which the article is formed moves in a fixed circular path.

Accordingly, one of the objects of the present invention is to provide a mechanism wherein a forming die of greatly increased size and nearly any shape can be employed and in which the die enters the pulp mixture in the forming tank over its entire die surface, travels through the tank for a relatively long period of time to enable a thick or heavy deposit of fiber material to be formed on the die surface, and on leaving the pulp mixture no portion of the die is immersed in the mixture longer than any other portion.

Another object is to provide a mechanism whereby any large and particularly irregular shaped article can be transferred from the die on which it is formed directly to another die on which it is retained while the water remaining in the article after formation is removed by suitable dehydrating mechanism.

Still another object of this invention is to provide means wherein the two cooperating dies, one the forming die and the other the dehydrating die, are interlocked by means other than the die surfaces or die portions during their co-active mating relationship thereby maintaining the dies in accurate alignment with each other during the period when the article is being transferred from the die on which it is formed onto the die on which it is dehydrated.

A further object of this invention is to provide means whereby the relative speed of motion of the co-acting dies, or either forming die and/or the dehydrating die are adjusted relative to each other during the period of co-active relationship, while allowing for different relative speeds of motion at other points in their travel to permit a closer spacing of dehydrating die mountings and dies or for other specific purposes.

For the purpose of fully describing the various objects and features of my invention, reference is made to the following description of preferred embodiments thereof, together with the accompanying drawings, in which:

Fig. 2 is a side elevational section taken along the line 2—2—2—2 of Fig. 2 at the condition of "contact" of the forming and dehydrating dies;

Fig. 6 is a diagrammatic elevational view of a torque drive mechanism for preferred use with the chain mechanism of Fig. 5.

Fig. 7 is a schematic view of a modified driving means providing a modulation of angular velocity to the forming dies at the co-acting point of the rotation showing the gear train and eccentric drive linkage;

Fig. 8 is a sectional view of the registration rollers and arm taken along line 8—8 of Fig. 9; and Fig. 9 is an enlarged sectional view of the chain driven suction cup at the point of contact with the co-acting forming die registration arm showing the means of registration of the forming die and dehydrating die at their co-acting positions.

Like characters of reference designate corresponding parts in all figures of the drawings.

While for purposes of simplicity I have shown a simple dish shaped die and article as illustrating the die's shape, the dies and articles for which this machine and mechanism are particularly adapted are actually larger and more irregularly shaped articles than are here shown. It will also be observed that I have shown six forming die positions about the forming die wheel, but this is simply illustrative rather than limiting either to this number or to a lesser or greater number of die positions. It will further be observed that a substantial amount of space is preferably allowed between successive forming die positions to permit the use of larger dies and die carriers.

Figure 1:
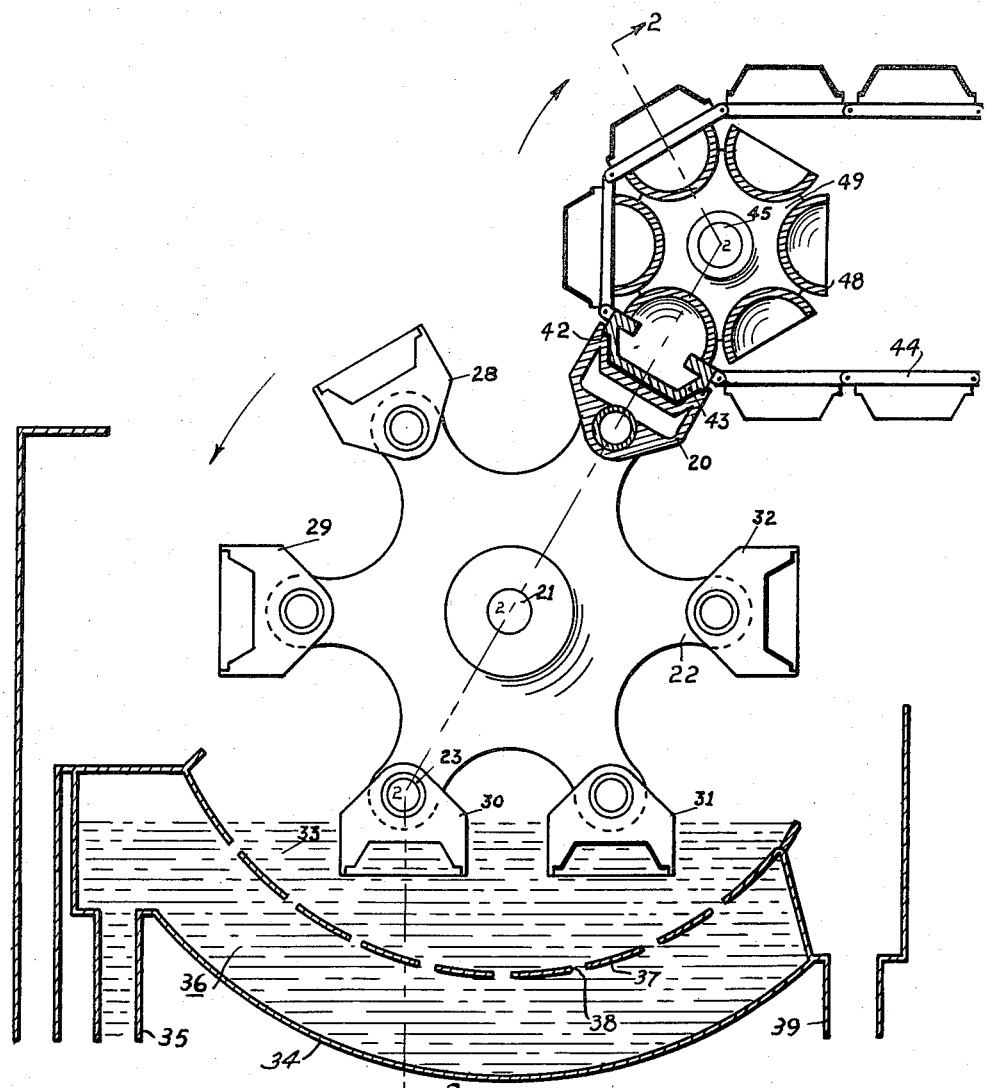
Fig. 1 is a diagrammatic sectional side elevation of the pulp molding machine of my invention as taken perpendicular to the axis of rotation of the shaft which drives the rotating forming die spider and the chain mechanism which carries the dehydrating dies.

Referring particularly to Figs. 1 and 2, the pulp molding machine of my invention has a frame 56 supporting in its lower portion a tank 34 adapted to contain a pool of dilute water-fiber mixture 33. The pool 33 is maintained at a predetermined level in tank 34 through forced circulation of the mixture which enters at pipe 35 and fills the chamber 36 between the outer wall of the tank 34 and the inner wall 37 and then passes through openings 38 in the inner wall 37 into the pool of mixture 33. A surplus quantity of fiber mixture is preferably introduced, the surplus overflowing the outer edge of the inner wall 37 and returning through pipe 39 for recirculation by means of a pump and storage tank (not shown), back through pipe 35 with such added pulp mixture as may be necessary to maintain the level of the pool 33.

The preferred mechanism employed to continuously rotate the forming dies and maintain the cooperating forming and dehydrating dies in synchronism with each other during the time when an article is transferred from the forming die to the dehydrating die includes a forming die carrier wheel shaft 21 mounted in suitable bearings on machine frame 56 for continuous rotation about a fixed axis above tank 34, said shaft having mounted thereon a wheel with a hub 27 carrying six spaced arms 22, each arm carrying on its outer end 61 (Fig. 2) a rotatably mounted tubular shaft member 23 on which forming dies 20 and 28 through 32 are mounted to provide for pivotal movement thereof.

Figure 3:
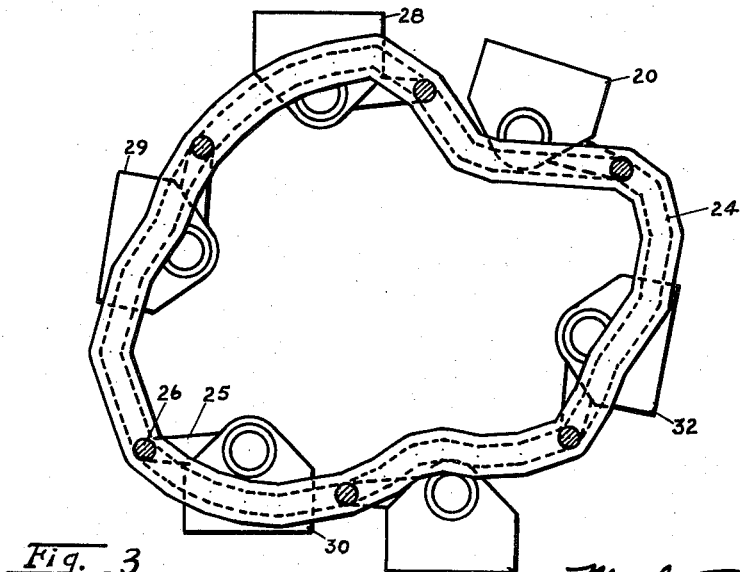
Fig. 3 is a sectional side elevational view taken along a line 3—3 of Fig. 2 showing the circular stationary cam track and the relationship of the forming dies and their followers at one position of angular progression.

The pivotal movement of each of said forming dies angularly about its pivot with its shaft 23 is controlled by a camming mechanism including a cam lever 25 mounted on each of said dies extending generally tangentially thereof and carrying at its free end a cam follower 26 acted upon to pivot said dies by a cam track 24 mounted in fixed position on frame 56 of the machine. The fixed cam track 24 (Fig. 3) operates to pivot each of the forming dies not only to maintain it with its outer face generally alined with the surface of the pool of water-fiber mixture 33 in tank 34 so as to provide a substantially uniform layer of felted fibers 40 on said die as it passes through said mixture, but also to aline it with a cooperating dehydrating die when said dies are in mating relationship. By means of such novel arrangement, I am not only enabled to provide a relatively simple continuously operating machine which provides for generally alining the face of a continuously moving forming die as it passes through the water-fiber mixture but also for transferring the article formed thereon directly to a continuously moving dehydrating die all as later more fully explained.

Particularly in the manufacture of articles which are relatively large in area, and especially with those which have an irregular contour, it is desirable and sometimes necessary that the formed articles 42 continuously be retained on dehydrating dies during the period in which the water or other liquid remaining after formation is being removed, usually by the application of heat. Therefore, I place such articles, after forming, directly on dehydrating dies, these being arranged on an extended chain conveyor or other mechanism so that they can be transported with the articles thereon through a suitable dehydrating mechanism which will remove the water remaining in the articles at this point in their process of production.

Accordingly, I employ the pivotal motion of a forming die about the axis of its tubular shaft 23 in a manner similar, although different in timing, to that employed to maintain an even immersion of the forming die during its passage through the liquid fiber mixture in the forming tank, as above described, with the cam track 24 acting on cam lever 25 to pivot a forming die angularly about its pivot to maintain it generally alined with a mating dehydrating die during the time said dies are in cooperating relation to transfer a formed article 42.

Figure 4:
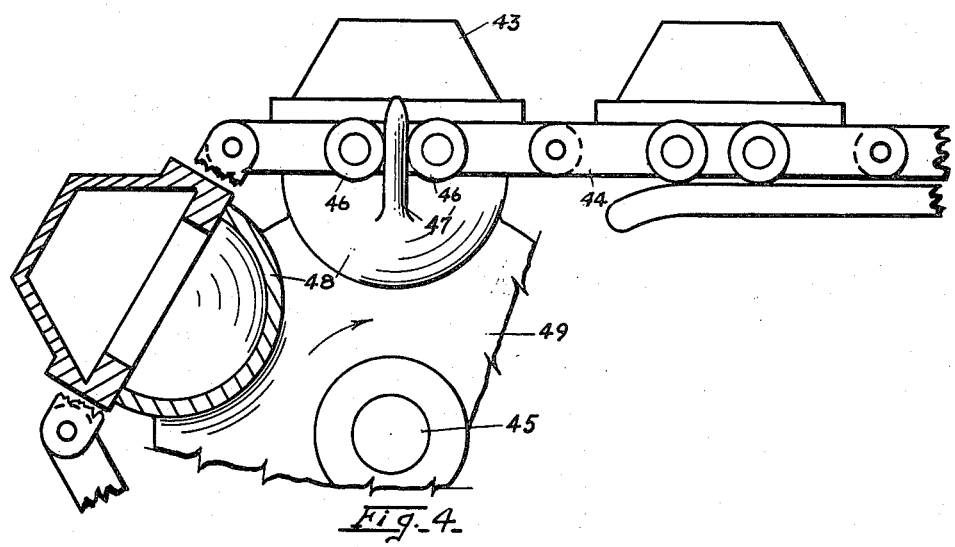
Fig. 4 is an enlarged view partly in section and partly in clear view taken on line 4—4 of Fig. 2 showing the interlocking of the dehydrating die with its mating suction cup sprocket.

The dehydrating dies 43 are adapted to cooperate with the forming dies 20, and 28-32 to receive a formed article 42 therefrom, and are mounted on an extended chain conveyor 44 which passes through suitable dehydrating apparatus (not shown). The chain conveyor 44 is supported and guided, as well as driven, by a suction cup carrier wheel 49 carrying suction cups 48 which engage the rear faces of dehydrating dies 43 when such die 43 is in mating relationship with a forming die, said wheel 49 being mounted on shaft 45 supported in bearings 57 above machine frame 56 and spaced from the axis of forming die carrier wheel shaft 21 in adjustably fixed position. Pairs of rollers 46 are provided on conveyor chain 44 to cooperate with sprocket teeth 47, an integral part of suction cup carrier wheel 49 (Fig. 4).

To provide for suitable synchronous movement of the dehydrating and forming dies, forming die carrier shaft 21 and suction cup carrier shaft 45 are inter-connected by gears 51 and 52 mounted on shafts 21 and 45, respectively, said shafts being driven so that the speeds of a dehydrating die and a forming die are synchronous when said dies are in mating relation with one another. A gear motor 59 may be directly coupled to the shaft 21 by means of a flexible coupling 60 and by this means transmits continuous rotary motion at a uniform rate to all moving parts of the pulp molding machine. Accordingly, spur gear 51 is keyed to shaft 21 and thus drives spur gear 52 which in turn is keyed to shaft 45 which is keyed to and drives suction cup wheel 49, each of the gears 51 and 52 being provided with extra long gear teeth so that the spacing between shafts 21 and 45 can be varied or adjusted to compensate for the dies employed. Suction cup wheel 49 is, at each die station, accurately registered with a dehydrating die 43 by means of a mating roller 46 and sprocket tooth 47, thus insuring accurate registration of the mating dies. The radial in line clearance between each pair of co-acting dies is adjustable by means of dove-tailed guides 54 and 55, guides 54 being mounted on bearings 57 and guides 55 each an integral part of the machine frame 56, said guides being secured together by bolts 58 and arranged parallel to the coaxial line of contact of the mating forming and dehydrating dies. It is thus simple to adjust the space between mating dies to accommodate articles of varying thickness as well as to compensate for variations in die sizes and thus provide a more flexible and useful machine.

Preferably, it is also desirable and sometimes essential to provide a means of proper registration and alinement at the co-acting point of the forming and dehydrating die elements 20 and 43 so that the article of manufacture may be properly transferred for dehydration, and I accordingly may provide alining means at the point of die register. Thus the dehydrating die 43 is provided with an integral alinement arm 117 offset thereon and arranged to cooperate with and simultaneously to engage four rollers 118 mounted on bell-crank arm 119, which arm is integrally secured to a forming die 20, and 28-32, and which oscillates said forming die so that its approach toward the tangential motion of a dehydrating die 43 causes the alinement arm 117 (the entering surfaces of which are involute in form as in 117a) to mesh with rollers 118 causing exact alinement and anti-rock mating of the forming and dehydrating dies during the time they are maintained in their mating relationship.

The forming dies 20 and 28-32 and dehydrating dies 43 each are of a type known to the art and include a foraminous plate having an outer face shaped to conform to one face of the article to be produced, the forming dies being operated by applying reduced pressure thereto to felt fibers on said face when it is passed through the pool of dilute water-fiber mixture 33 in tank 34, and the dehydrating dies being operated to transfer the felted fibers from a forming die when said dies are in mating relation by applying a reduced pressure to the die face and preferably also by applying a positive pressure to the mated forming die to aid such transfer, such dehydrating dies conforming to the other face of article 42 to support it during drying.

Referring now to Fig. 2, to provide suitable controlled programming of vacuum and pressure, forming die arms 22 are constructed with bores at their ends 61 to receive hollow shafts 23 which shafts are secured to the forming dies 20 and 28-32 by means of locking set screws or other suitable means (not shown). These hollow shafts, with their forming dies, rotate freely within the bushed bearings of the forming die wheel arm ends 61 under cam control by means of cam arm 25 and follower 26 as above described. The radial arms 22 of the forming wheel are internally cored to provide air and water passages 62 which terminate on the face of the central hub section 27. A valve member 65 is mounted in fixed position on machine frame 56 to cooperate with suitable ports in hub 27. Preferably, electrical insulation is provided between said valve member 65 and the hub member 27, an insulating sealing member 64 being affixed to the main hub 27, and being provided with openings therethrough, so that connections are provided at proper times for the programming of the forming operation between the cored passage 62 and the outlet pipes 72 and 73 in said valve member. To retain the valve member 65 in contact with its sealing and insulating member 64, a retaining ring 67, also provided with an insulating disk, is secured to the forming wheel hub 27 by any suitable means such as cap screws 68. This sealing disk between the valve member 65 and the retaining ring 67 may be secured to either one of these two members, or may be left to normally remain stationary with the valve disk 65, or to rotate with the retaining disk 67. To completely insulate and separate the valve member 65, it is further preferable that an insulating bushing 65a be affixed thereto, thus permitting the shaft 21 to rotate freely therein, while maintaining electrical insulation between the shaft and the disk. To effect still further insulating against the flow of electric currents from the pulp mixture to various parts of the machine, the dies 20, and 28—32, together with the hollow shafts 23 to which these are affixed, are insulated from the forming wheel arms 22 by means of insulating bushings and disks 23a. To further effect a complete electrical isolation of the forming dies from the rest of the machine, the cam track 24 is mounted on the main frame 56 by means of insulating members 24a.

The object of these various insulating members is to prevent a flow of electric current either from the pulp mixture to some part of the machine, or between certain portions of the machine when it is desirable to employ certain types or kinds of fiber mixtures and/or other materials which have a tendency to generate within themselves electric currents to the detrimental effect of both the product and the machine.

As shown in Fig. 2, the hollow shafts 23 rocking within the insulated bushings in arm ends 61 are equipped with peripheral air ports milled so as to aline with the radial passages terminating on the inside diameter of the bushing as at 76 in all angular positions of the rocking forming dies 20 and 28—32, thus providing for continuous removal of water to the point of ejection of the formed pulp article 42 from the die 20 during its angular movement 74. A like passage 77 is milled in the periphery of the tubular shaft 23 at the point in line with opening 78 in the forming dies, thus permitting transmission of pressure and vacuum to said dies. In like manner, the application of vacuum may be made to suction cup wheel 49.

In Fig. 1, die 30 has moved in the direction of the arrow and has entered the pulp mixture pool 33. Normally, only a low vacuum or suction is applied to the die 30 and formation of an article 40 on the die from the liquid mixture pool 33 has just begun. Vacuum is preferably applied gradually to the forming die by means of a graduated or tapered port 70 in the stationary valve member 65, this to effect a more even rate of fiber deposit throughout the entire thickness of the article. As the fiber deposit increases in thickness during the passage of the forming die through the liquid-fiber mixture, the resistance of liquid flow through the fiber deposit increases, hence the desirability of varying the vacuum or suction application to the forming die in inverse relation to its travel through the forming period.

It will thus be observed that the position of the die 30 throughout its formation period or the period when the article is being formed from the liquid pulp mixture (and which formation cannot be improved or modified so far as fiber deposit is concerned except while the die is immersed in the tank) has passed completely through the tank 34 while remaining generally alined with the mixture surface. What is most important, however, is that at the point where the die leaves the pulp mixture all its surfaces leave the pulp mixture generally alined with the surface thereof and hence there can be no uneven deposit due to one portion or edge of the die leaving the mixture before another.

Figure 5:
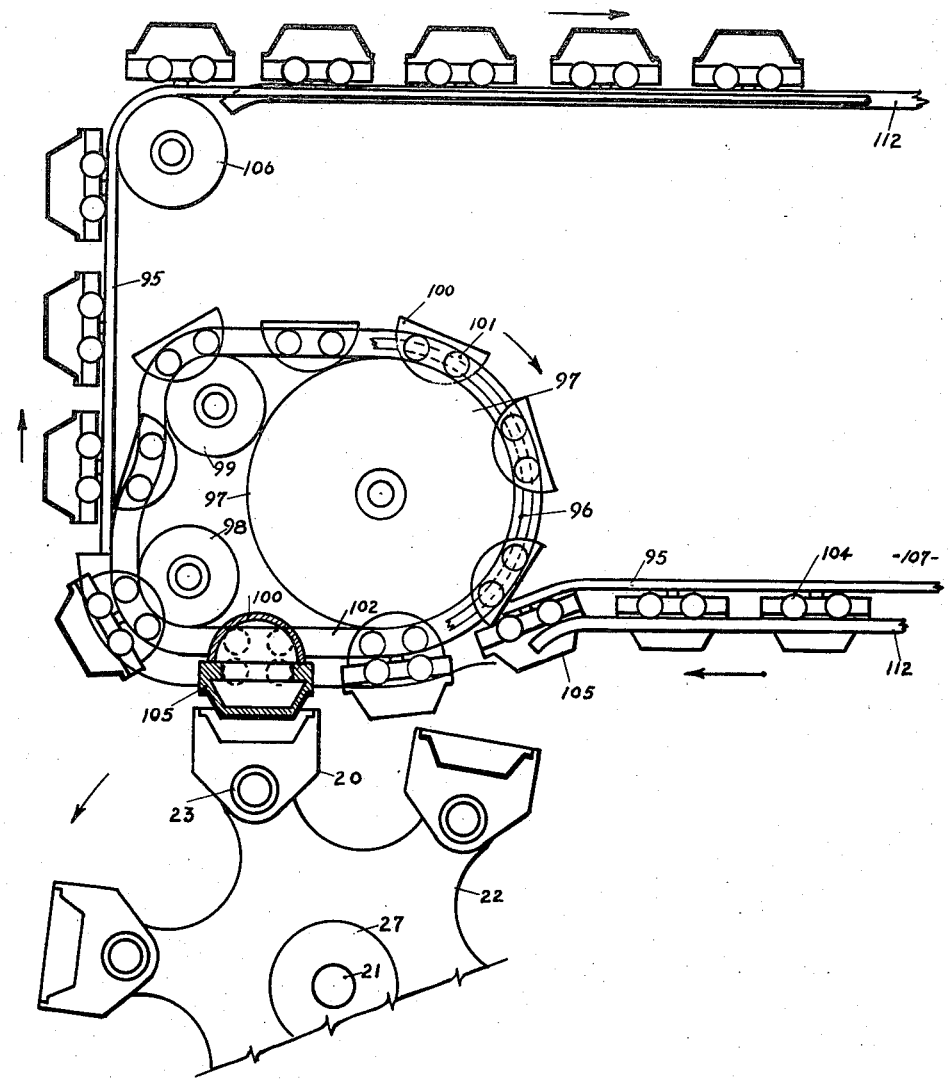
Fig. 5 is a diagrammatic view of modified means of transferring the formed pulp article from the forming dies to a continuous chain conveyor for movement on dehydrating dies through a dehydrating unit.

As larger articles are formed and higher rates of molding and transfer velocity are used with the machine of this invention, it is sometimes desirable to use an alternate means of guiding the dehydrating dies and of driving their chain conveyor, which means will impart smoother and more stable motion to the dehydrating die chain conveyor, and will also bring the suction cups into contact with, and out of contact with the dehydrating dies in a smooth flowing manner of linear synchronization. Accordingly, as shown in Figs. 5 and 6, the forming die wheel with arms 22 with forming dies 20 and 28—32 as previously described is re-arranged to provide for mating die contact at the top of its continuous travel in the forming cycle (rather than at approximately 30° before the vertical as shown in Fig. 1) and the cam track 24 (Fig.3) is altered to provide co-acting motion of said forming dies at this point of rotation. In like manner, the valve ports 70—71 are correspondingly relocated to conform to the previously described vacuum and air pressure programming to serve the relocated point of die contact and article transfer. As illustrated in Fig. 5, above the forming dies and generally tangential to the path of the die rotation are mounted two conveyor chains 95 and 96 driven and guided into operative relation as described below and travelling under gear driven coordination (gear train not shown) in the direction indicated by the motion arrows, motion of certain elements of Fig. 5 being adapted for uniform angular velocity while other elements are adapted for a modified angular velocity as hereinafter described.

Endless chain conveyor 96 supported on sprockets 97, 98 and 99 and driven by sprocket 97 carries a plurality of suction cups 100, each mounting four rollers 101, two on either side, said rollers travelling in a formed guide track 102 throughout the entire circuit of their travel around the three sprockets 97, 98 and 99 and thereby imparting to the suction cup 100 controlled peripheral motion throughout the route of travel of chain 96 and sprocket paths 97, 98 and 99, and particularly guiding said cups into engagement with the rear face of dehydrating dies 105.

Endless chain conveyor 95 carried on and driven by sprocket 106 to pass through a dehydrating chamber (not shown) and returning to the molding machine is synchronized in linear velocity with suction cup conveyor chain 96 and mounts a plurality of dehydrating dies 105 at regular intervals, each die 105 being equipped with four rollers 104, two on each side and diametrically opposed in pairs and to guide the die on guide tracks 112 for cooperation with suction cups 100.

In high speed operation of the dehydrating die chain conveyor 95 leading to the dehydration unit, it is imperative that no slack be permitted to develop in the chain in the zone of product transfer or handling. Therefore, in Fig. 6 is illustrated a torque converter mechanism in diagrammatic representation which concentrates any slack of the chain at a non-operative point of the chain circuit. The master driving sprocket 106 which moves the chain 95 carrying the dehydrating dies is driven at a predetermined speed by mechanism hereinafter described. Located at the far end of the dehydrating apparatus through which the dehydrating dies pass after they receive articles from the forming dies, is a sprocket 113 which serves two purposes. First, it serves to reverse the direction of the travel of the chain 95, at which point the articles are removed from the dehydrating dies and the dehydrating dies are brought back to the forming mechanism to receive other formed articles, and, second, it serves to maintain sufficient tension on the chain 95 through its travel at 114 so that no looseness or slack can develop through this area. Sprocket 113 is driven by any suitable method. Preferably, however, it is driven by a torque motor which tends to drive the sprocket 113 slightly faster than the predetermined speed of the chain 95 as controlled by the master driving sprocket 106. The speed of the motor driving sprocket 113 is automatically controlled by the speed of the motor driving sprocket 106, but at all speeds it tends to run slightly faster, the characteristics of this type of motor permitting it to "slip" into uniform driving speed with that of sprocket 106, thus maintaining a fixed and uniform tension on the chain 95 through the travel area 114.

Sprocket 115 is also preferably driven by a torque motor with proper characteristics to cause it to tend to run somewhat slower than the motor driving the master sprocket 106, thus maintaining proper and necessary tension on the chain 95 through the area of article transfer. Sprocket 98 serves only as an idler to assist in changing the direction of the chain 95 from a horizontal to a vertical direction.

It is also necessary that a means of proper registration and alinement be provided at the co-acting point of the dies 20 and 105 so that the article may be properly transferred without injury or distortion. Therefore in Figs. 8 and 9 are shown two views of this registration means at the co-acting point (as in Fig. 5), Fig. 8 being a view taken along line 8—8 of Fig. 9 showing the die 105 (Fig. 9) with an integral offset alinement arm 117 arranged simultaneously to engage the four rollers 118 attached to bell-crank arm 119 which is integrally secured to shaft 23 which oscillates with a forming die 20 and 28—32 so that the approach of said die toward the tangential motion of dehydrating die 105 causes the alinement arm 117 (the entering surfaces of which are involute in form as in 117a) to mesh with rollers 118 causing exact alinement and anti-rock meshing of said dies.

In certain applications of the pulp molding machine of this invention, particularly that of Fig. 5, it may be desirable to impart to the rotating forming dies a modulation of angular velocity both above and below the normal angular velocity (of the machine as illustrated in the driving means in Fig. 2). It is also necessary that the momentary reduction of angular velocity be compensated for in a subsequent acceleration to a higher angular velocity than average to maintain the productive capacity of the machine of this invention, thus permitting closer spacing of the dehydrating dies on the conveyor chain leading to the dehydrating unit. Accordingly, in Fig. 7 is illustrated an alternate means of driving the pulp molding machine including a spur gear train, the view being in diagrammatic representation and intended to show the theory of the speed changer or modulating mechanism without the complication of surrounding unimportant frame and journal mountings.

Illustrated in relative positions as viewed from the righthand side along 7—7 of Fig. 2 is shown in Fig. 7 the shaft 21 on which shaft forming dies are supported and moved as previously described. Mounted on shaft 21 and free to rotate on this shaft 21 is an idler gear 84 and an arm 85 likewise mounted on shaft 21 and free to rotate upon shaft 21 independently of shaft 21 and gear 84. Pivoted on the lower end of arm 85 by means of journal 86 is a cluster gear 87—88 of integral construction, gear 87 being secured to and driving gear 88, both rotating freely upon journal 86 and driven by idler gear 84, which in turn is driven by gear 90, keyed to the output shaft of a gear motor or other driving means (not shown) at a predetermined speed to meet the requirements of the pulp molding machine operation.

Driven in turn at a uniform velocity from idler gear 84 are intermediate gears 123—124 which in turn drive gear 97a mounted on and keyed to drive the shaft of sprocket 97 (Fig. 5) at a predetermined velocity. Also driven by and integrally mounted on gear 97a is gear 97b which through intermediate gear 125 drives gear 106a, arranged to drive sprocket 106 (Fig. 5) at a predetermined velocity. Direction of rotation of each element of the gear train is indicated by an arrow on the gear element.

Preferably mounted integrally with gear 84, and rotating therewith, is a cam plate 120, which, for clarity of illustration, is shown as being displaced to the left in Fig. 7. It may, however, be mounted separately from gear 84, in which case it is driven at the same velocity as gear 84 by any suitable means such as a gear shown by the broken lines 84a. This cam plate has a cam track 122 in which runs a roll 121 mounted on arm 126 which by means of a fixed pivot 91, imparts to connecting rod 94 through pivot 92 a reciprocating motion as at 92a and in turn through pivot 93 on arm 85 imparts to arm 85 an angular oscillating motion as at 85a—93a. This causes cluster gears 87—88 to roll with the rotation of gear 84 as at 87a—88a and imparting to gear 89 which is keyed to and drives shaft 21 of the molding machine such reduction of angular velocity as may be desired. This angular oscillation is timed to coincide with the co-acting position of the mating dies of the molding machine, bringing the gear train and shaft 21 which carry the forming dies to such a reduced angular velocity as may be required for proper co-action of the forming and dehydrating dies.

Upon return of the arm from its alternate position 85a to normal position 85, the angular velocity of the gear 89 is accelerated and the next set of dies rapidly brought into the contact point for repetition of the operation described above.

By means of cams of different sizes and characteristics (120—122) the modulation of velocity in the gear train may be set up through a wide range of velocity conditions to meet any requirements of special molding problems.

This modulating mechanism is designed and intended to provide for wide spacing of the forming dies 20 and 28—32 in the machine in Fig. 5 and closer spacing of the dehydrating dies 105 on the chain conveyor 95 (Fig. 5), thereby reducing the length of the chain and the dehydrating mechanism.

Thus it will be seen that I have provided a novel pulp molding machine which not only operates continuously to provide a level immersion of a forming die but also transfers the molded article directly to a continuously moving dehydrating die upon which die the liquid remaining in the article after formation is removed.

Various modifications may be made in the mechanism herein illustrated without departing from the character and scope of my invention.

Having thus fully described the invention, what I claim as new and desire to secure by Letters Patent is:

1. In a pulp molding machine including a forming die carrier wheel mounted rotatably above a tank adapted to contain a water fiber mixture, a plurality of suction forming dies mounted at intervals on the periphery of the carrier wheel for movement into and through said mixture during rotation of the carrier wheel, valve means associated with the carrier wheel for connecting the forming dies with a source of suction during their movement through said mixture, and a plurality of dehydrating dies mounted at intervals on an endless conveyor for movement successively into registration with the forming dies to receive molded articles therefrom, the improvement comprising driving means for advancing the dehydrating die conveyor at a constant predetermined speed, and a variable speed drive mechanism operatively connected to the forming die carrier wheel and adapted to rotate said wheel at a normal speed in synchronization with the dehydrating dies when the successive forming and dehydrating dies are in registration and to drive said wheel at angular velocities both above and below said normal speed when the dies are elsewhere in their path of travel.

2. In a pulp molding machine including a forming die carrier wheel mounted rotatably above a tank adapted to contain a water-fiber mixture, a plurality of suction forming dies mounted pivotally at intervals on the periphery of the carrier wheel for movement into and through said mixture during rotation of the carrier wheel, valve means associated with the carrier wheel for connecting the forming dies with a source of suction during their movement through said mixture, a plurality of dehydrating dies mounted at intervals on an endless conveyor for movement successively into registration with the forming dies to receive molded articles therefrom, and cam means for pivoting the forming dies into registration with the dehydrating dies, the improvement comprising driving means for advancing the dehydrating die endless conveyor at a constant predetermined speed, a second driving means for tending to advance said conveyor at a faster speed to maintain tension therein between said first and second driving means and to concentrate any slack elsewhere in the conveyor, and a variable speed drive mechanism operatively connected to the forming die carrier wheel and adapted to rotate said wheel at a normal speed in synchronization with the dehydrating dies when the successive forming and dehydrating dies are in registration and to drive said wheel at compensated angular velocities both above and below said normay speed when the dies are elswhere in their path of travel.

References Cited in the file of this patent

UNITED STATES PATENTS

| | | |
|---|---|---|
| 558,676 | Cunningham et al. | Apr. 21, 1896 |
| 924,721 | Arbuckle | June 15, 1909 |
| 1,162,233 | Goddu | Nov. 30, 1915 |
| 1,393,219 | Hohl | Oct. 11, 1921 |
| 1,409,900 | Adams | Mar. 21, 1922 |
| 1,618,289 | Koppelman | Feb. 22, 1927 |
| 1,719,819 | Koppelman | July 2, 1929 |
| 1,804,203 | Chaplin | May 5, 1931 |
| 2,163,585 | Chaplin | June 27, 1939 |
| 2,165,364 | Ferngren | July 11, 1939 |
| 2,244,033 | Trempe | June 3, 1941 |
| 2,357,201 | Hornbostel | Aug. 29, 1944 |
| 2,432,322 | Lundstrom | Dec. 9, 1947 |
| 2,445,416 | Baker et al. | July 20, 1948 |
| 2,452,980 | Beltz | Nov. 2, 1948 |
| 2,559,945 | Chaplin | July 10, 1951 |
| 2,624,728 | Dubpernell | Jan. 6, 1953 |

UNITED STATES PATENT OFFICE

CERTIFICATE OF CORRECTION

Patent No. 2,925,863                    February 23, 1960

Merle P. Chaplin

It is hereby certified that error appears in the printed specification of the above numbered patent requiring correction and that the said Letters Patent should read as corrected below.

Column 2, line 18, for "2-2-2-2 of Fig. 2" read -- 2-2-2-2 of Fig. 1 --.

Signed and sealed this 16th day of August 1960

(SEAL)
Attest:

KARL H. AXLINE
Attesting Officer

ROBERT C. WATSON
Commissioner of Patents